United States Patent
Maraldo et al.

(10) Patent No.: US 10,261,237 B2
(45) Date of Patent: Apr. 16, 2019

(54) INSTRUMENT CLUSTER, IN PARTICULAR FOR A VEHICLE

(71) Applicant: MAGNETI MARELLI S.p.A., Corbetta (IT)

(72) Inventors: Marco Maraldo, Milan (IT); Sylvain Mouard, Magenta (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 0 days.

(21) Appl. No.: 15/519,652

(22) PCT Filed: Oct. 30, 2015

(86) PCT No.: PCT/IB2015/058413
§ 371 (c)(1),
(2) Date: Apr. 17, 2017

(87) PCT Pub. No.: WO2016/067267
PCT Pub. Date: May 6, 2016

(65) Prior Publication Data
US 2017/0242184 A1    Aug. 24, 2017

(30) Foreign Application Priority Data
Oct. 30, 2014   (IT) .............................. TO2014A0895

(51) Int. Cl.
*B60K 37/02*        (2006.01)
*F21V 8/00*         (2006.01)
(Continued)

(52) U.S. Cl.
CPC ............ *G02B 6/0076* (2013.01); *B60K 35/00* (2013.01); *B60K 37/02* (2013.01); *G02B 6/00* (2013.01);
(Continued)

(58) Field of Classification Search
CPC .................. B60K 2350/2039; B60K 2350/203
See application file for complete search history.

(56) References Cited

U.S. PATENT DOCUMENTS 4,975,807 A * 12/1990 Ohashi .................. B60K 37/02
                                                 362/23.01
5,432,684 A     7/1995 Fye et al.
(Continued)

FOREIGN PATENT DOCUMENTS

DE       102010051307 A1    5/2012
EP          0878341 A1     11/1998
(Continued)

OTHER PUBLICATIONS

International Search Report and Written Opinion of the International Searching Authority for PCT International Application No. PCT/IB2015/058413 dated Feb. 9, 2016.

*Primary Examiner* — Andrew J Coughlin
(74) *Attorney, Agent, or Firm* — Howard & Howard Attorneys PLLC

(57) ABSTRACT

An instrument cluster, in particular for a vehicle, has a dial with a plurality of graphic areas, which are backlit by a device provided with at least one light source, with a front light-guiding element having a front face at least partially covered by a back surface of the dial, and with a rear light-guiding element; the latter has a receiving portion facing said light source and a transmitting portion, which transmits and guides the light received by the receiving portion and is spaced apart from and faces a rear face of the front light-guiding element; the rear face of the front light-guiding element has an optical compensation system, having curved convex or curved concave lens surfaces, for varying the intensity of the light transmitted from said transmission portion to the different graphic areas.

6 Claims, 2 Drawing Sheets

(51) Int. Cl.
  *B60K 35/00*   (2006.01)
  *G02B 6/00*    (2006.01)
  *G09F 13/04*     (2006.01)

(52) U.S. Cl.
  CPC ............ *G02B 6/006* (2013.01); *G02B 6/0011* (2013.01); *G02B 6/0053* (2013.01); *B60K 2350/2039* (2013.01); *G09F 13/0409* (2013.01); *G09F 2013/049* (2013.01)

(56) References Cited

U.S. PATENT DOCUMENTS

| | | | |
|---|---|---|---|
| 6,179,430 B1 | 1/2001 | Le Du | |
| 2010/0039808 A1 | 2/2010 | Purchase et al. | |
| 2011/0051393 A1* | 3/2011 | Ishikawa | G01D 11/28 362/23.19 |

FOREIGN PATENT DOCUMENTS

| | | |
|---|---|---|
| JP | 2006214953 A | 8/2006 |
| JP | 2011047790 A | 3/2011 |
| JP | 2012118215 A | 6/2012 |

\* cited by examiner

INSTRUMENT CLUSTER, IN PARTICULAR FOR A VEHICLE

TECHNICAL FIELD

The present invention relates to an instrument cluster, in particular for a vehicle.

BACKGROUND ART

As it is known, an instrument cluster for vehicles has different graphic areas, which are shaped so as to provide the driver with different items of information. For example, these graphic area can display numbers, letters, marks of graduates scales, logos, etc.; moreover, some graphic areas may have a mere aesthetic function in the instrument cluster.

The graphic areas are usually defined by transparent or semi-transparent portions of a polycarbonate plate. These portions are back-lit, so as to make the corresponding items of information visible, in particular in the night light. The polycarbonate plate is normally lit by a backlighting device comprising at least one light source, namely a LED light source, and a light-guiding element, which is arranged under the polycarbonate plate and transmits light from the light source to the different zones located in the graphic areas. In this way, the light reaches the graphic areas through reflection and diffusion inside the material of the light-guiding element, so that the driver visually perceives the graphic areas in a clear fashion and without any bother. Furthermore, in many solutions, the light-guiding element is treated or processed so as to make the lighting as uniform as possible among the graphic areas arranged in different positions in the instrument cluster.

Recently, for aesthetic reasons, the need has been felt to provide graphic areas defined by openings of the polycarbonate plate, which are engaged by projecting portions of the light-guiding element.

With this type of solution, higher manufacturing costs must be accepted. As a matter of fact, for the same type of vehicle, constructors generally build instrument clusters having the same shape and the same overall dimensions, but provided with graphic areas arranged in different positions and/or with different shapes. By way of example, let's think of instrument clusters that are different because of the fact that they have revolution-counters or speed indicator instruments provided with different full scales, where the markings and the indicating numbers are hence arranged in different positions. As a result, when using a light-guiding element provided with projecting portions that define the aforesaid markings, for each type of instrument cluster it is necessary to provide a dedicated light-guiding element—and not only a dedicated polycarbonate plate.

In the solution shown in FIG. 4 of JP2006214953A, which corresponds to the preamble of claim 1, the graphic areas of the instrument cluster are defined by projecting portions of a front light-guiding element, which is arranged above a rear light-guiding element, which receives light from a light source and then transmits it to the front light-guiding element.

A face of the rear light-guiding element is provided with a plurality of recesses, which are arranged in respective positions that are aligned with the projecting portions of the front light-guiding element. These recesses allow the light flow to be uniform among the different markings or graphic areas provided in the instrument cluster. In particular, the aforesaid recesses have a substantially triangular profile, fulfil the function of a prism, namely a reflection surface, and have different depth, so as to vary the lighting among the different markings.

This solution is scarcely satisfactory, as not only the front light-guiding element, but also the rear light-guiding element must be manufactured and processed in a dedicated manner in order to obtain the different instrument clusters, since the positions of the recesses described above vary depending on the position of the markings, with a consequent increase of manufacturing times and costs.

Furthermore, the shape of the recesses is not ideal to direct the light at the markings defined by the front light-guiding element, since the result depends on the relative position between the recesses and the LED sources.

DISCLOSURE OF INVENTION

The object of the present invention is to provide an instrument cluster, in particular for a vehicle, which can solve the drawbacks described above in a simple and cost-effective manner, preferably without using additional components.

According to the present invention, there is provided an instrument cluster, in particular for a vehicle, as claimed in claim 1.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
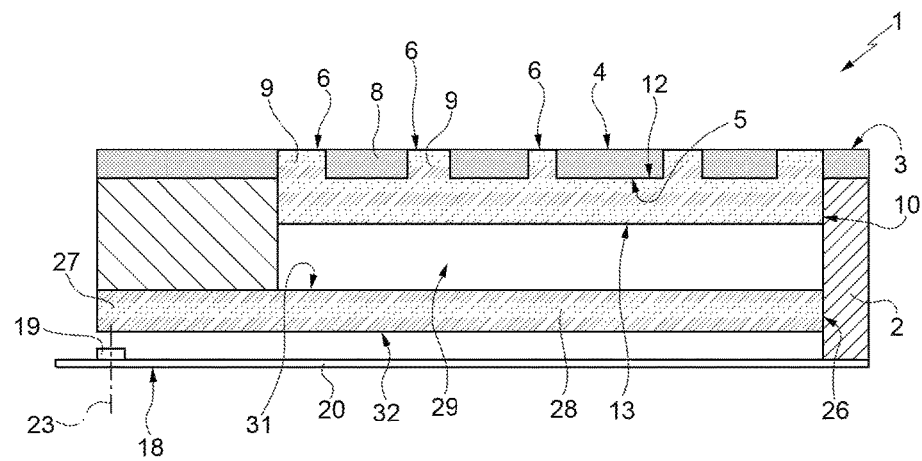
FIG. 1 shows a cross-section view of an instrument cluster, in particular for a vehicle, according to the present invention.

In FIG. 1, number 1 indicates an instrument cluster (shown schematically and in a cross-section view), in particular for a vehicle. The instrument cluster 1 comprises a body 2, which is not described in detail, is made of a light-proof material impermeable to light, and basically fulfils a support function so as to support the other components of the instrument cluster 1 in a fixed position.

The instrument cluster 1 comprises, furthermore, a dial 3 defined by a plate, which is preferably made of polycarbonate and has a front surface, which in use faces the drivers, and a back surface 5, which is arranged opposite the surface 4.

The plate 3 has a plurality of graphic areas, indicated by reference number 6. In the example described herein, the graphic areas 6 represent respective marks of a graduated scale. More in general, the graphic areas can represent a number, a logo, a letter, a bargraph, etc., so as to provide the driver with a corresponding item of information concerning the driving and/or the state of the vehicle; or they can simply have an aesthetic function for finishing the instrument cluster 1.

Figure 3:
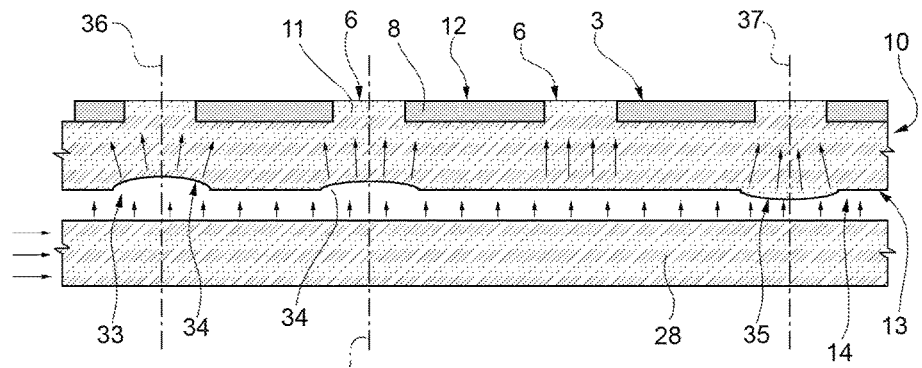
FIG. 3 shows an enlargement of a detail of figure 1.

As you can see in FIGS. 1 and 3, at least some of the graphic areas 6 are defined by respective openings made through an opaque or light-proof portion 8, which is part of the plate 3, and are engaged by respective projections 9, which are part of a light-guiding element 10. According to variants that are not shown herein, the projections 9 are part of two or more light-guiding elements, which are arranged beside each other and behind the plate 3.

Figure 4:
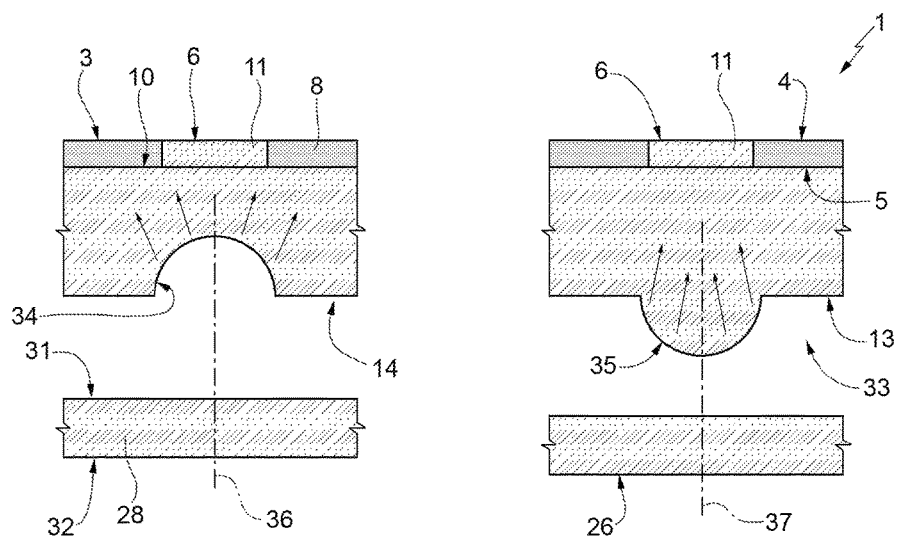
FIG. 4 is similar to FIG. 3 and shows, on an even larger scale and with parts removed for greater clarity, a variant of the instrument cluster of the previous figures.

In the embodiment of FIG. 4, the graphic areas are defined by respective portions 11 of the plate 3, which are transparent or semi-transparent and are surrounded by the portion 8, whereas the light-guiding element 10 has a front face without projections. Obviously, it is possible to provide a mixed solution, in which the graphic areas 6 are defined partly by projections 9 and partly by portions 11.

In the solution of FIGS. 1 and 3, the projections 9 protrude with respect to a front face, which is indicated by reference number 12, is covered by the portion 8, and preferably rests against the surface 5 of the plate 3. The projections 9 preferably have a front surface, which is flush to the surface 4 of the plate 3. The light-guiding element 10 has, furthermore, a rear face 13, which is arranged opposite the face 12 and comprises a flat zone 14. In particular, the flat zone 14 and the faces 4, 5 and 12 are parallel to each other. In variants that are not shown herein, the face 12 is defined by a curved surface, or by a series of flat and/or curved surfaces joined to each other, or by a flat surface that is not parallel to the flat zone 14.

With reference to FIG. 1, the light-guiding element 10 defines part of a backlighting device 18, which is designed to backlight the graphic areas 6, for example in case of night driving conditions.

The device 18 comprises at least one LED source 19, which is designed to emit a light beam and is supported and supplied with power by a printed circuit board 20 (also known as PCB). For the sake of simplicity, the LED source 19 is considered as a punctiform light source. In the example shown herein, the printed circuit board 20 is parallel to the flat zone 14, whereas the LED source 19 is arranged so as to emit a light beam whose optical axis 23 is orthogonal to the flat zone 14; however, a different arrangement could be suggested, for example with an optical axis 23 parallel to the flat zone 14 and/or with a light source arranged in a position other than the one shown in the figures.

Figure 2:
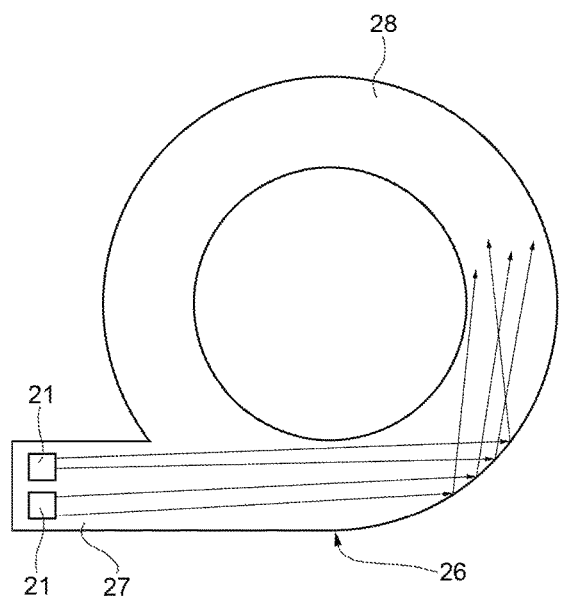
FIG. 2 shows a plan view of a component of the instrument cluster of FIG. 1.

With reference to FIGS. 1 and 2, the device 18 comprises, furthermore, a light-guiding element 26, which comprises, in turn, a portion 27 that is arranged in a position facing the LED source 19, so as to directly receive, namely without reflections, its light beam. The light-guiding element 26 comprises, furthermore, a portion 28, which directly faces the face 13 and is spaced apart from it, so as to define a relatively small empty space or "gap" 29 between the elements 10 and 26. The accompanying drawings are schematic and are not to scale, hence the height of the gap 29 and the thicknesses of the elements 10 and 26 may not correspond to reality.

The light-guiding elements 10 and 26 are supported by the body 2 in a known manner, which is not described in detail, and are made of a transparent plastic material, which is known and not described in detail, having properties that allow it to transmit and guide light on the inside.

Advantageously, the portion 28 has a surface 31 facing and parallel to the flat zone 14, so that the gap 29 has a substantially constant height. The surface of the portion 28 arranged opposite the surface 31 is indicated with reference number 32 and, according to variants that are not shown herein, it is treated or processed regardless of the position of the graphic areas 6, so as to make the diffusion of light from the surface 32 to the surface 21 uniform.

As you can see in FIG. 2, the light emitted by the LED sources 21 is collected by the portion 27 and then transmitted to the portion 28 through diffusion on the surfaces defining the light-guiding element 26. The intensity of the transmitted light naturally decreases as the optical path of the light increases and, therefore, as the distance from the portion 27 increases. Furthermore, there are brightness peaks in the area of the first surface of the portion 28 on which the light rays emitted by the LED sources 19 reflect. Therefore, the light transmitted by the light-guiding element 10 through the gap 29 is not uniform.

As you can see in FIG. 3, the device comprises an optical compensation system 33, which is deigned to vary the intensity of the light transmitted to the graphic areas 6 and to compensate a lack of uniformity in the intensity of the light received from the light-guiding element 10. In particular, the optical compensation system 33 is designed so as to:
 reduce the intensity of the light transmitted to those graphic areas 6 that are closer to the portion 27 or are close to light intensity peaks due to particular reflection in the portion 28, and/or
 increase the intensity of the light transmitted to those graphic areas 6 that are farther from the portion 27 or are close to less bright zones of the portion 28.

According to an aspect of the present invention, the optical compensation system 33 is defined by the face 13 and is not made on the light-guiding element 26. In this way, the light-guiding element is made in a dedicated manner based on the position of the graphic areas 6, but the light-guiding element 26 can be made in the same way for a whole series of instrument clusters 1 having the same overall dimensions and shape, though varying the position of the graphic areas 6 in the different instrument clusters 1.

According to an aspect of the present invention, the optical compensation system 33 is defined by a plurality of lens surfaces, namely by concave curved surfaces 34 and/or convex curved surfaces 35, defining respective recesses and projections with respect to the flat zone 14 of the face 13.

The surfaces 34, 35 receive the light emitted by the portion 28 in the gap 29 and are each advantageously coaxial to a relative graphic area 6 along an axis 36, 37. The axes 36 and 37, in the example shown herein, are orthogonal to the flat area 14. As you can see in FIGS. 3 and 4, each surface 34, being concave, tends to disperse light outwards relative to the axis 36 in the material of the light-guiding element 10. On the contrary, each surface 35, being convex, tends to concentrate light in the material of the light-guiding element 10 towards the axis 37. The extent to which light is dispersed and concentrated basically depends on the curvature of the surfaces 34, 35 and on possible procedures or surface treatments of the surfaces 34, 35.

In particular, the concavity can be intended as a "negative curvature", the convexity can be intended as a "positive curvature" and the flat surface can be intended as a "zero curvature". As you can see in FIG. 3, by progressively changing the curvature of the different lens surfaces, for example depending on the distance from the portion 27, one can adjust the light intensity transmitted from the portion 28 to the different graphic areas 6. Generally speaking, the face 13 could have only surfaces 34 with a different concavity or only surfaces 35 with a different convexity, or it could have at least one surface 34 and at least one surface 35 (as shown in FIG. 3). If necessary, the optical compensation system 33 could be defined by one single surface 34, so as to reduce a particular peak of light, or by a single surface 35, so as to intensify the light in a graphic area arranged in a position that is particularly far from the light source 21.

Owing to the above, it is evident that, by shaping the face 13 so as to obtain the optical compensation system 33, one can light the graphic areas 6 in a very homogeneous manner and manufacture the light-guiding element 10 as an interchangeable component for different instrument clusters 1, at the same time leaving the freedom to create customized configurations of the graphic areas 6 on the dial 3. As a matter of fact, in order to carry out these customizations, users simply need to change the light-guiding element 10 and the dial 3.

Furthermore, it is evident that the solution of the present invention for the optical compensation system 33 is particularly effective, is relatively simple to be manufactured, and does not require additional components (for example, it does not need a larger number of LEDs compared to known solutions).

Thanks to the gap 29, the light-guiding elements 10 and 26 are not in contact and, therefore, the device 18 avoids the formation of preferential paths for the transmission of light, which would cause a lack of uniformity that cannot be foreseen at a designing stage, and it also avoids possible frictions between the elements 10 and 26 due to vibrations during the use of the vehicle.

Other advantages are evident to a person skilled in the art through the description above.

Finally, it is clear that the instrument cluster 1 described with reference to the accompanying drawings can be subject to changes and variations, which do not go beyond the scope of protection of the present invention, as defined in the appended claims.

In particular, the shape and the dimensions of the different components may be different from the ones that are schematically shown in the accompanying figures. Furthermore, there may be no flat zone 14, especially if the graphic areas 6 and, therefore, the axes 36, 37 are relative close to each other.

Moreover, the instrument cluster 1 may be used in applications other than the vehicle-related one and/or may use light sources other than LEDs.

The invention claimed is:

1. An instrument cluster, in particular for a vehicle, comprising:
   a dial having a plurality of graphic areas and comprising a back surface;
   a backlighting device for backlighting said graphic areas; the backlighting device comprising at least one light source, a front light-guiding element distinct from said dial and having a front face and a rear face opposite to each other, and a rear light-guiding element; said front face being at least partially covered by said back surface; said rear light-guiding element comprising:
   a) a receiving portion facing said light source for directly receiving a light beam emitted, in use, by said light source, and
   b) a transmitting portion for transmitting and guiding the light received by said receiving portion; said transmitting portion having an emitting face which is spaced apart from and faces said rear face;
   the rear face of said front light-guiding element comprising a plurality of coplanar flat zones and a plurality of curved lens surfaces for varying the intensity of the light transmitted from said emitting face to the different graphic areas;
   said curved lens surfaces being separated from each other along said rear face by said coplanar flat zones and are curved convex or curved concave so as to define a projection or, respectively, a recess with respect to said coplanar flat zones;
   wherein, at least some of said graphic areas are coaxial to a single one of said curved lens surfaces along a respective axis that extends orthogonally to said coplanar flat zones.

2. The instrument cluster according to claim 1, wherein said curved lens surfaces have different convexities.

3. The instrument cluster according to claim 1, wherein said emitting face is flat, and said coplanar flat zones are parallel to said emitting face.

4. The instrument cluster according to claim 1, wherein said dial has a plurality of through apertures, respectively defining said graphic areas and engaged by respective projecting portions of said front light-guiding element.

5. The instrument cluster according to claim 1, wherein said curved lens surfaces have different concavities.

6. An instrument cluster, in particular for a vehicle, comprising:
   a dial comprising a back surface and a plurality of through apertures, the through apertures defining respective graphic areas;
   a backlighting device for backlighting said graphic areas; the backlighting device comprising at least one light source, a front light-guiding element distinct from said dial and having a front face and a rear face opposite to each other, and a rear light-guiding element; said front face being at least partially covered by said back surface; said rear light-guiding element comprising:
   a) a receiving portion facing said light source for directly receiving a light beam emitted, in use, by said light source, and
   b) a transmitting portion for transmitting and guiding the light received by said receiving portion; said transmitting portion having an emitting face which is spaced apart from and faces said rear face;
   the rear face of said front light-guiding element comprising at least one curved lens surface which is curved convex or curved concave for varying the intensity of the light transmitted from said emitting face to the different graphic areas;
   wherein, at said front face, said front light-guiding element comprises a plurality of projecting portions, respectively engaging said through apertures.

* * * * *